(12) United States Patent
Yamamoto et al.

(10) Patent No.: US 9,688,153 B2
(45) Date of Patent: Jun. 27, 2017

(54) ELECTRIC VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Takuya Yamamoto, Okazaki (JP); Hidetoshi Ono, Kyoto (JP); Eiji Akita, Okazaki (JP); Naoki Kida, Okazaki (JP); Tomoaki Yokoyama, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/737,634

(22) Filed: Jun. 12, 2015

(65) Prior Publication Data

US 2015/0360572 A1 Dec. 17, 2015

(30) Foreign Application Priority Data

Jun. 13, 2014 (JP) ................................. 2014-121963

(51) Int. Cl.
*B60L 11/14* (2006.01)
*B60L 3/00* (2006.01)

(52) U.S. Cl.
CPC ............ *B60L 11/14* (2013.01); *B60L 3/0061* (2013.01); *B60L 2240/425* (2013.01); *B60L 2240/445* (2013.01); *B60L 2260/28* (2013.01); *Y02T 10/642* (2013.01); *Y02T 10/70* (2013.01); *Y02T 10/7077* (2013.01)

(58) Field of Classification Search
CPC ......... B60L 11/14; B60L 11/02; B60L 3/0061
See application file for complete search history.

(56) References Cited

U.S. PATENT DOCUMENTS

| 4,405,029 | A | * | 9/1983 | Hunt ........................ | B60K 6/24 180/303 |
| 4,470,476 | A | * | 9/1984 | Hunt ........................ | B60K 6/26 180/65.25 |
| 5,343,970 | A | * | 9/1994 | Severinsky ............ | B60K 6/387 180/165 |

(Continued)

FOREIGN PATENT DOCUMENTS

| JP | 55-40806 Y2 | 9/1980 |
| JP | 4-297330 A | 10/1992 |

(Continued)

*Primary Examiner* — J. Allen Shriver, II
*Assistant Examiner* — Brian Cassidy
(74) *Attorney, Agent, or Firm* — Birch, Stewart, Kolasch & Birch, LLP

(57) ABSTRACT

An electric vehicle includes: an engine which is disposed on a front side in the vehicle, and which is configured to drive rear wheels of the vehicle, the engine which includes a crank shaft that is extended in a front/back direction of the vehicle; and a drive motor which is arranged in line with the engine in a width direction of the vehicle, and which is disposed on an air intake side of the engine, the drive motor which is configured to drive front wheels of the vehicle.

6 Claims, 2 Drawing Sheets

(56) References Cited

U.S. PATENT DOCUMENTS

| | | | | |
|---|---|---|---|---|
| 6,381,955 B1* | 5/2002 | Morganti | F01N 3/2013 | 60/274 |
| 6,428,438 B1* | 8/2002 | Bowen | B60K 6/36 | 475/5 |
| 6,617,704 B2* | 9/2003 | Tomikawa | B60K 6/52 | 180/65.225 |
| 6,638,195 B2* | 10/2003 | Williams | B60K 6/38 | 180/243 |
| 6,648,785 B2* | 11/2003 | Porter | B60K 6/26 | 180/65.6 |
| 6,684,970 B2* | 2/2004 | Gotou | B60K 6/52 | 180/243 |
| 6,962,224 B2* | 11/2005 | Nakanowatari | B60K 6/44 | 180/65.225 |
| 7,163,480 B2* | 1/2007 | Supina | B60K 6/40 | 475/5 |
| 7,216,943 B2* | 5/2007 | Nishikawa | B60W 20/11 | 180/233 |
| 7,258,183 B2* | 8/2007 | Leonardi | B60K 6/28 | 180/65.1 |
| 7,325,638 B1* | 2/2008 | Belloso | B60K 5/08 | 180/14.2 |
| 7,383,902 B2* | 6/2008 | Matsuzaki | B60K 6/44 | 180/243 |
| 7,455,135 B2* | 11/2008 | Janson | B60K 6/365 | 180/65.25 |
| 7,530,413 B2* | 5/2009 | Rayl | B60K 6/48 | 180/65.25 |
| 8,209,968 B2* | 7/2012 | Miyashita | B60K 6/24 | 60/301 |
| 8,232,756 B2* | 7/2012 | Yoshihara | B60K 6/48 | 318/430 |
| 8,249,768 B2* | 8/2012 | Mori | B60K 6/445 | 123/90.15 |
| 8,538,618 B2* | 9/2013 | Nissato | B60W 20/00 | 477/5 |
| 8,545,367 B2* | 10/2013 | Hartz | B60K 6/40 | 192/3.26 |
| 8,573,348 B2* | 11/2013 | Cantemir | B60K 6/40 | 180/246 |
| 8,674,636 B2* | 3/2014 | Matsuo | B60L 7/14 | 318/400.01 |
| 8,827,016 B2* | 9/2014 | Viengchai | B60K 6/12 | 180/65.21 |
| 8,959,912 B2* | 2/2015 | Hoess | B60K 6/48 | 123/559.1 |
| 9,302,671 B2* | 4/2016 | Yamazaki | F02N 11/04 | |
| 2003/0033992 A1* | 2/2003 | Ohnemus | B60K 1/04 | 123/3 |
| 2004/0020697 A1* | 2/2004 | Field | B60K 6/40 | 180/65.23 |
| 2004/0200648 A1* | 10/2004 | Tarasinski | B60W 20/30 | 180/65.7 |
| 2005/0116680 A1* | 6/2005 | Ishikawa | B60K 6/26 | 318/801 |
| 2005/0230976 A1* | 10/2005 | Yang | B60K 6/442 | 290/4 R |
| 2007/0034427 A1* | 2/2007 | Janson | B60K 6/365 | 180/65.22 |
| 2007/0034428 A1* | 2/2007 | Janson | B60K 6/365 | 180/65.235 |
| 2009/0076696 A1* | 3/2009 | Perkins | B60K 23/08 | 701/69 |
| 2009/0224623 A1* | 9/2009 | Saito | B60K 6/448 | 310/156.53 |
| 2010/0224429 A1* | 9/2010 | Akiyama | B60K 6/445 | 180/65.22 |
| 2011/0004363 A1* | 1/2011 | Severinsky | B60H 1/004 | 701/22 |
| 2011/0079454 A1* | 4/2011 | Maguire | B60K 6/442 | 180/65.25 |
| 2012/0187758 A1* | 7/2012 | Boskovitch | B60K 6/387 | 307/10.1 |
| 2013/0085653 A1* | 4/2013 | Furuta | F02M 25/0702 | 701/102 |
| 2013/0118433 A1* | 5/2013 | Tochizawa | F02M 35/10026 | 123/184.21 |
| 2014/0210262 A1* | 7/2014 | Yaegaki | B60K 6/48 | 307/10.1 |
| 2014/0330466 A1* | 11/2014 | Bureau | B60K 6/48 | 701/22 |
| 2015/0073641 A1* | 3/2015 | Hashimoto | B60K 6/445 | 701/22 |
| 2015/0175103 A1* | 6/2015 | Yamazaki | B60R 16/02 | 701/29.1 |
| 2015/0210151 A1* | 7/2015 | Husson | B60K 17/28 | 180/65.21 |
| 2015/0210271 A1* | 7/2015 | Yamazaki | F02N 11/04 | 701/22 |
| 2016/0375756 A1* | 12/2016 | Choi | B60K 6/52 | 475/5 |

FOREIGN PATENT DOCUMENTS

| | | |
|---|---|---|
| JP | 8-98322 A | 4/1996 |
| JP | 2010-200426 A | 9/2010 |

\* cited by examiner

ELECTRIC VEHICLE

CROSS-REFERENCE TO RELATED APPLICATION(S)

This application is based upon and claims the benefit of priority from prior Japanese patent application No. 2014-121963, filed on Jun. 13, 2014, the entire contents of which are incorporated herein by reference.

BACKGROUND

The present invention relates to an electric vehicle including a motor and an engine for driving the vehicle.

There is an electric vehicle including a motor and an engine for driving the vehicle (for example, refer to JP-A-8-98322, JP-UM-B-55-40806, JP-A-4-297330 and JP-A-2010-200426).

Electric vehicles including motors and engines for driving the vehicles (so-called hybrid cars) are roughly classified into a "one-motor parallel system" and a "two-motor series parallel system". For development of a sports utility vehicle with high cross-country performance (hereinafter referred to as cross-country SUV), the "one-motor parallel system" is typically selected for the following reason. That is, when a cross-country SUV travels mainly using a motor, it is difficult to satisfy the performance of "continuous travel on a rough road" and "traction" required in the cross-country SUV due to the capability of the motor. A vehicle using the "two-motor series parallel system" is unsuitable for cross-country travel because the vehicle cannot travel using an engine alone. The "one-motor parallel system" is a system in which an engine is mainly used and its driving force is assisted by a motor. A vehicle using the "one-motor parallel system" can travel using the engine alone. It can be therefore said that the "one-motor parallel system" is suitable for cross-country travel.

In the configuration of an electric vehicle using the "one-motor parallel system", which is, for example, an electric vehicle 50 shown in FIG. 2, a clutch 52 and a drive motor 53 are provided between an engine 51 and a transmission 54 so as to be connected to a rear wheel drive shaft 58 and rear wheels 59 through a transfer 55, a rear propeller shaft 56 and a rear differential 57 and also connected to a front wheel drive shaft 62 and front wheels 63 through the transfer 55, a front propeller shaft 60 and a front differential 61. Incidentally, the reference numerals 64, 65 and 66 in FIG. 2 represent an exhaust pipe, a fuel tank and a battery respectively.

When the engine 51 is stopped and the clutch 52 is disconnected, the electric vehicle 50 can perform EV travel using the drive motor 53. When the engine 51 is operated and the clutch 52 is connected, the electric vehicle 50 can perform parallel travel in which the output of the engine 51 is assisted by the drive motor 53. However, due to the one-motor system, drive and power generation using the drive motor 53 cannot be performed concurrently. Thus, there is a problem that the electric vehicle 50 cannot perform series travel or series parallel travel.

The "one-motor parallel system" provided with only one motor thus cannot perform series travel or series parallel travel. Therefore, the "one-motor parallel system" cannot satisfy users who request series travel or series parallel travel as well as cross-country performance.

Thus, existing systems cannot provide high cruising performance as EV while providing high cross-country performance as SUV. That is, existing systems cannot make the two performances compatible. In addition, when a drive motor or a power generation motor is added to an electric vehicle in order to obtain high cruising performance, it is necessary to take into consideration the influence of heat from an engine.

SUMMARY

An object of the invention is to provide an electric vehicle providing high cross-country performance and high cruising performance and having small affection of heat from an engine to a motor.

In order to achieve the object, according to an aspect of the invention, there is provided an electric vehicle comprising: an engine which is disposed on a front side in the vehicle, and which is configured to drive rear wheels of the vehicle, the engine which includes a crank shaft that is extended in a front/back direction of the vehicle; and a drive motor which is arranged in line with the engine in a width direction of the vehicle, and which is disposed on an air intake side of the engine, the drive motor which is configured to drive front wheels of the vehicle.

The electric vehicle may further comprise: a first output transmission mechanism which is disposed between the engine and the drive motor, and which is configured to transmit an output from the drive motor to the front wheels.

The electric vehicle may further comprise: a power generation motor which is arranged in line with the crank shaft in the width direction of the vehicle, and which is configured to generate electric power using an output of the engine; and a second output transmission mechanism which is disposed between the engine and the power generation motor, and which is configured to transmit the output from the engine to the power generation motor.

The power generation motor may be disposed to be offset on the air intake side of the engine relatively to a position of the crank shaft in the width direction of the vehicle.

DETAILED DESCRIPTION OF EXEMPLARY EMBODIMENTS

An embodiment of an electric vehicle according to the invention will be described below with reference to FIGS. 1A and 1B.

Embodiment 1

Figure 1A:
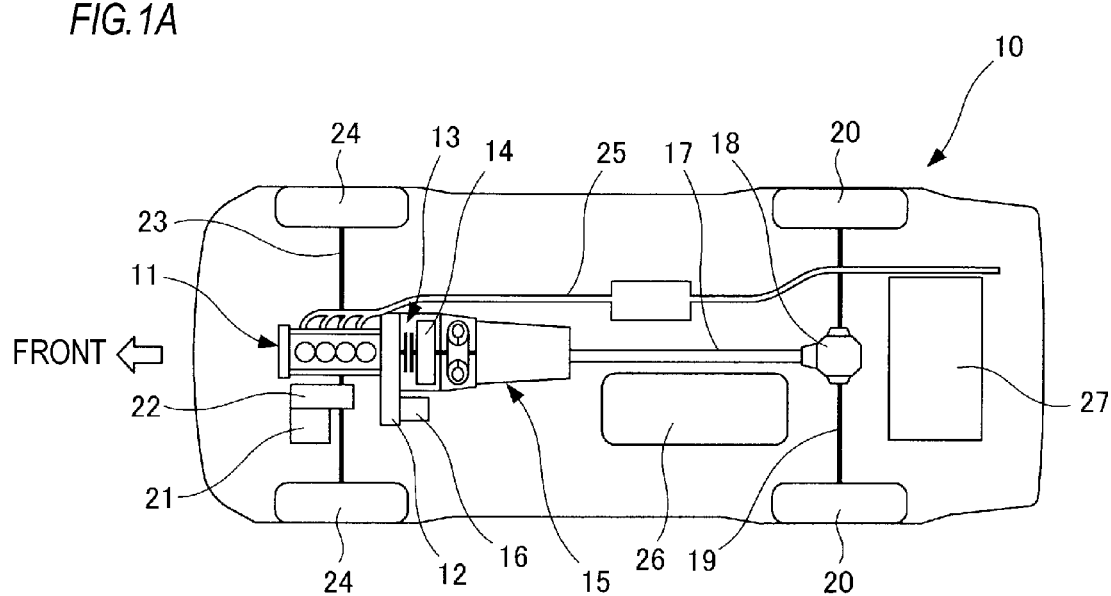
FIG. 1A is a schematic view showing an electric vehicle according to the invention.
Figure 1B:
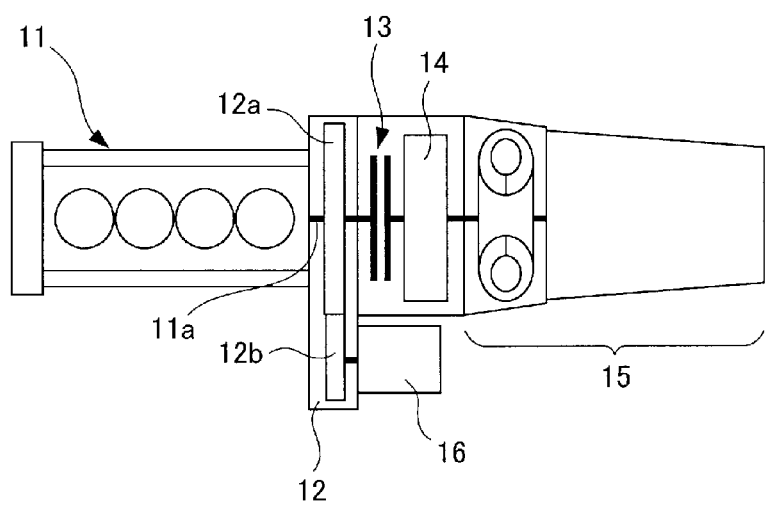
FIG. 1B is a schematic view showing the layout of a drive system for rear wheels in the electric vehicle.

FIG. 1A is a schematic view showing an electric vehicle according to the embodiment, and FIG. 1B is a schematic view showing the layout of a drive system for rear wheels in the electric vehicle.

A vehicle 10 in the embodiment is an electric vehicle, which includes an engine 11 (internal-combustion engine) for driving rear wheels 20, and a front drive motor 21 for driving front wheels 24. The front drive motor 21 is disposed to be displaced from the engine 11 in the vehicle width direction. Namely, the engine 11 and the front drive motor 21 are arranged in line with each other in the vehicle width direction.

The configuration of the vehicle 10 will be described specifically. The output of the engine 11 is transmitted to a clutch 13 and a rear drive motor 14 through a gear 12a. The output of the engine 11 or the rear drive motor 14 or the outputs of the engine 11 and the rear drive motor 14 are then transmitted to a propeller shaft 17 through an automatic transmission 15, and further transmitted to a rear wheel drive shaft 19 and the rear wheels 20 through a differential gear 18. The engine 11, the gear 12a, the clutch 13, the rear drive motor 14, the automatic transmission 15, the propeller shaft 17 and the differential gear 18 are disposed coaxially in the front/rear direction of the vehicle 10.

Here, an AT (Automatic Transmission) with a torque converter, an AMT (Automatic Manual Transmission) or the like may be used as the automatic transmission 15, and one for 2WD (two wheel drive) may be used.

In addition, according to the configuration, the output of the front drive motor 21 is transmitted to a front drive shaft 23 and front wheels 24 through a transaxle 22 (first output transmission mechanism). The transaxle 22 is disposed between the engine 11 and the front drive motor 21.

In addition, according to the configuration, the vehicle 10 has a power generation motor 16 that generates electric power using the output of the engine 11. The output of the engine 11 is transmitted to the power generation motor 16 through gears 12a and 12b (second output transmission mechanism). A crank shaft 11a of the engine 11 and the power generation motor 16 are disposed to be displaced from each other in the vehicle width direction. In other words, the crank shaft 11a and the power generation motor 16 are arranged in line with each other in the vehicle width direction. The gears 12 (gears 12a and 12b) are disposed between the engine 11 and the power generation motor 16.

In the vehicle 10, the engine 11 is disposed vertically on the front side in the vehicle 10, and the front drive motor 21 is disposed on the air intake side opposite to an exhaust pipe 25 of the engine 10. The power generation motor 16 is disposed on the air intake side in the same manner. Here, to dispose the engine vertically is to dispose the engine to extend the crank shaft of the engine in the front/rear direction of the vehicle. Incidentally, in FIG. 1A, the exhaust pipe 25 is disposed on the right side of the vehicle 10, and the front drive motor 21 and the power generation motor 16 are disposed on the left side opposite thereto. However, when the exhaust pipe 25 is disposed on the left side of the vehicle 10, the front drive motor 21 and the power generation motor 16 may be disposed on the right side opposite thereto.

Such a layout prevents the front drive motor 21 and the power generation motor 16 from being affected by the heat source of the engine 11 or particularly heat transmitted from the exhaust pipe 25 side. In addition, the transaxle 22 is disposed between the engine 11 and the front drive motor 21 and the gears 12 are disposed between the engine 11 and the power generation motor 16. Therefore, the influence of the heat on the front drive motor 21 and the power generation motor 16 can be reduced by the transaxle 22 and the gears 12.

In addition, a fuel tank 26 storing fuel to be supplied to the engine 11 is disposed in an underfloor part near the center of the vehicle 10. Further, a battery 27 supplying electric power to the rear drive motor 14 and the front drive motor 21 and charged with electric power generated by the power generation motor 16 is disposed in an underfloor part on the rear side of the vehicle 10.

The vehicle 10 has a system in which the automatic transmission 15 is combined with the two-motor hybrid system constituted thus by the engine 11, the rear drive motor 14 and the power generation motor 16. Further, the front drive motor 21 is combined with the combined system. Due to the configuration made thus, the vehicle 10 can be formed as a PHEV (Plug-in Hybrid Electric Vehicle) high in quality as a product supporting any travel mode and using an electric 4WD system, as will be described later.

In addition, in the vehicle 10, using the FR (Front-engine Rear-drive) layout in which the engine 11 is placed vertically, the rear drive motor 14 is disposed coaxially with the engine 11 through the gears 12, while the power generation motor 16 is disposed to be offset to the air intake side of the engine 11 relatively to the position of the crank shaft 11a in the vehicle width direction, and the automatic transmission 15 is further disposed coaxially with the engine 11 and the rear drive motor 14. That is, the vehicle 10 serves as a vertical FR vehicle and as a PHEV of an electric 4WD system using front-motor drive.

Figure 2:
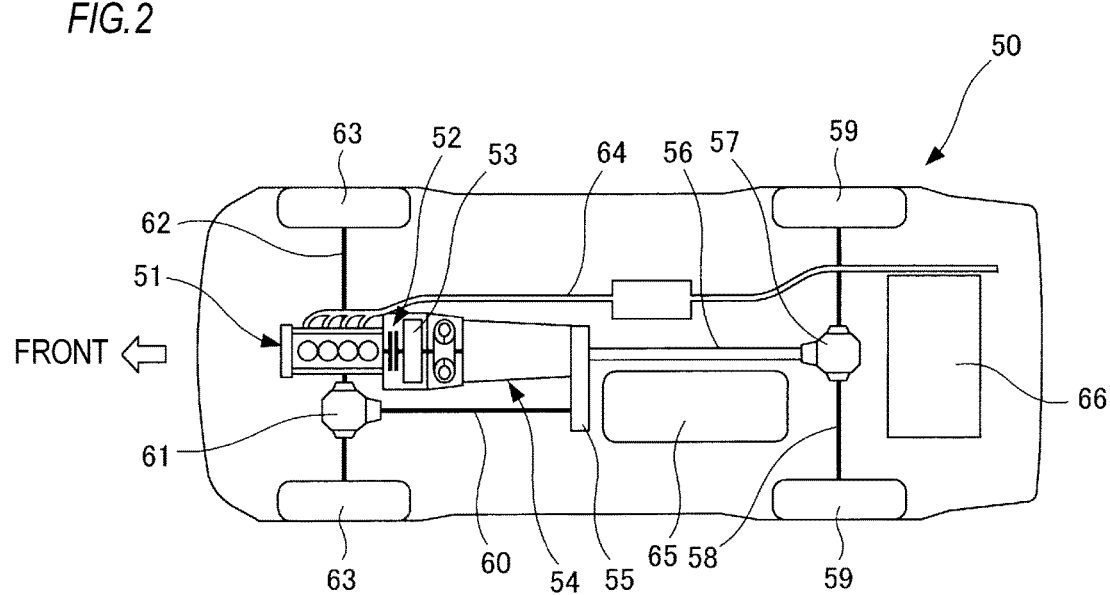
FIG. 2 is a schematic view showing a related-art one-motor parallel system electric vehicle.

In this manner, in the system in which the rear drive motor 14 and the power generation motor 16 are placed between the engine 11 and the automatic transmission 15, the position where the automatic transmission 15 is mounted is indeed retreated to the rear side of the vehicle 10 to thereby affect the underfloor layout of the fuel tank 26 etc. However, when the system is arranged to electric 4WD as described above, a transfer (see the reference numeral 55 in FIG. 2) can be removed. Thus, the influence on the underfloor layout can be suppressed.

In addition, when the power generation motor 16 is disposed, it is difficult to lay out a front propeller shaft (see the reference numeral 61 in FIG. 2) and the exhaust pipe 25. However, when the system is arranged to electric 4WD as described above, the front propeller shaft can be removed. When the power generation motor 16 is disposed on the air intake side opposite to the exhaust pipe 25, it is possible to make the layout of 4WD and the layout of the exhaust pipe 25 compatible.

Here, operation in each travel mode of the vehicle 10 according to the embodiment will be described with reference to Table 1.

TABLE 1

| | engine | clutch | drive motor | power generation motor |
|---|---|---|---|---|
| during engine travel | operated | ON | suspended | suspended |
| during EV travel | suspended | OFF | operated | suspended |
| during parallel travel | operated | ON | operated | suspended |
| during series travel | operated | OFF | operated | operated |
| during series parallel travel | operated | ON | operated | operated |

(During Engine Travel)

In the vehicle 10, during engine travel, the engine 11 is operated and the clutch 13 is turned ON, so as to transmit the output of the engine 11 to the rear wheels 20. On this occasion, the rear drive motor 14 and the power generation motor 16 are suspended. Thus, the vehicle 10 can be driven only by the engine 11.

(During EV Travel)

In the vehicle 10, during EV travel, the engine 11 is suspended and the clutch 13 is turned OFF while the rear drive motor 14 is operated to transmit the output of the rear drive motor 14 to the rear wheels 20. On this occasion, the power generation motor 16 is suspended. Thus, the vehicle 10 can be driven only by the rear drive motor 14.

(During Parallel Travel)

In the vehicle 10, during parallel travel, the engine 11 is operated and the clutch 13 is turned ON while the rear drive motor 14 is operated. Thus, the output of the engine 11 and the output of the rear drive motor 14 are transmitted to the rear wheels 20. On this occasion, the power generation motor 16 is suspended.

(During Series Travel)

In the vehicle 10, during series travel, the engine 11 is operated and the clutch 13 is turned OFF while the rear drive motor 14 is operated to transmit the output of the rear drive motor 14 to the rear wheels 20. On this occasion, the power generation motor 16 is operated to generate electric power using the output of the engine 11.

(Series Parallel Travel)

In the vehicle 10, during series parallel travel, the engine 11 is operated and the clutch 13 is turned ON while the rear drive motor 14 is operated. Thus, the output of the engine 11 and the output of the rear drive motor 14 are transmitted to the rear wheels 20. On this occasion, the power generation motor 16 is operated to generate electric power using the output of the engine 11.

In this manner, the vehicle 10 according to the embodiment can travel in any travel mode, in which the vehicle 10 can travel mainly using the engine all over the range from a low speed to a high speed, but the vehicle 10 can also perform series travel mainly using the motor. That is, the vehicle 10 can travel in any hybrid travel mode.

Accordingly, the vehicle 10 that can travel mainly using the engine all over the range from a low speed to a high speed is advantageous for continuous travel on a rough road, traction, etc. Thus, the vehicle 10 can be provided with high cross-country performance. In addition, the vehicle 10 can generate electric power using the output of the engine 11 during series travel and during series parallel travel. Thus, the vehicle 10 can be provided with high cruising performance.

In addition, when the system is arranged to electric 4WD as described above, a transfer can be removed. Thus, it is possible to suppress influence of hybridization on vehicle specifications (wheel base, whole length, etc.) or on the capacity of the fuel tank.

Further, due to individual motors for the front wheels and the rear wheels, driving forces of the motors can be distributed to the wheels without providing any mechanical torque distribution mechanism. It is therefore possible to control stable driving (control controllability and stability) of the motors.

Next, the superiority of the present invention will be described with reference to Table 2 showing the invention and a "one-motor parallel system" (the following comparative example) for comparison as to travel modes, and Table 3 showing them for comparison as to advantages and disadvantages as cross-country SUV and PHEV.

TABLE 2

|  | invention | comparative |
|---|---|---|
| continuous engine travel | ○ | ○ |
| EV travel | ○ | ○ |
| parallel travel | ○ | ○ |
| series travel | ○ | x |
| series parallel travel | ○ | x |
| charging during travel | ○ | ○ |
| charging during stop | ○ | ○ |

As shown in Table 2, series travel cannot be performed in the comparative example due to its configuration, but series travel can be performed in the invention so that charging with surplus power generation can be performed. In addition, series parallel travel cannot be performed in the comparative example due to its configuration, but series parallel travel can be performed in the invention.

The invention and the comparative example are equivalent to each other as to the other items, that is, continuous engine travel, EV travel, parallel travel, charging during travel and charging during stop. As for charging during travel, charging can be performed during series travel and during series parallel travel in the invention while charging can be performed only during engine travel in the comparative example.

TABLE 3

|  | invention | comparative |
|---|---|---|
| continuous travel on rough road | ○ | ○ |
| traction | ○ | ○ |
| PHEV quality as product | ○ | Δ |

In addition, as shown in Table 3, engine travel can be performed all over the range from a low speed to a high speed in the invention and the comparative example, so that continuous travel on a rough road and traction can be performed to provide high cross-country performance. Charging can be performed during series travel and series parallel travel in the invention, but charging can be performed only during engine travel in the comparative example. Therefore, the invention is superior in PHEV quality as a product.

As has been described, the invention has advantages over the "one-motor parallel system" in the comparative example. According to the invention, it is possible to make high cross-country performance and PHEV quality as a product compatible.

According to an aspect of the invention, it is possible to provide an electric vehicle providing high cross-country performance and high cruising performance and having small affection of heat from an engine to a motor.

The invention is suitable for an electric vehicle, and particularly suitable for an SUV high in cross-country performance.

What is claimed is:

1. An electric vehicle comprising:
    an engine disposed on a front of vehicle, and configured to drive rear wheels of the vehicle, the engine including a crank shaft extending in a front/back direction of the vehicle;
    a first output transmission mechanism disposed offset in a width direction of the vehicle with respect to the crank shaft and laterally on a side of the engine opposite an exhaust pipe of the engine; and
    a drive motor arranged opposing the first output transmission mechanism in the width direction of the vehicle, such that the first output transmission is disposed between the engine and the drive motor in the width direction of the vehicle,
    wherein the engine, the drive motor, and the first output transmission are aligned along a line parallel to the width direction of the vehicle.

2. The electric vehicle according to claim 1, wherein
the first output transmission mechanism is configured to transmit an output from the drive motor directly to a front drive shaft of the front wheels.

3. The electric vehicle according to claim 1, further comprising:
a power generation motor arranged offset with respect to the crank shaft in the width direction of the vehicle, and configured to generate electric power using an output of the engine; and
a second output transmission mechanism disposed between the engine and the power generation motor, and configured to transmit the output from the engine to the power generation motor.

4. The electric vehicle according to claim 3, wherein
the power generation motor is disposed to be offset with respect to the crank shaft in the width direction of the vehicle and in a direction opposite to the exhaust pipe.

5. The electric vehicle according to claim 2, further comprising:
a power generation motor arranged offset with respect to the crank shaft in the width direction of the vehicle, and configured to generate electric power using an output of the engine; and
a second output transmission mechanism disposed between the engine and the power generation motor, and configured to transmit the output from the engine to the power generation motor.

6. The electric vehicle according to claim 5, wherein
the power generation motor is disposed to be offset with respect to the crank shaft in the width direction of the vehicle and in a direction opposite to the exhaust pipe.

* * * * *